United States Patent [19]

Willbanks et al.

[11] Patent Number: 4,573,846

[45] Date of Patent: Mar. 4, 1986

[54] HAY BALE PROCESSOR

[76] Inventors: Weldon C. Willbanks; George Spector, both of 233 Broadway RM 3615, New York, N.Y. 10007

[21] Appl. No.: 651,525

[22] Filed: Sep. 17, 1984

[51] Int. Cl.⁴ .......................................... A01D 87/12
[52] U.S. Cl. .................. 414/24.6; 242/68.4; 242/86.5 R; 414/911
[58] Field of Search ............... 414/24.5, 24.6, 911; 242/68.4, 86.5 R, 86.52

[56] References Cited

U.S. PATENT DOCUMENTS

| | | | |
|---|---|---|---|
| 1,277,762 | 9/1918 | Sherman | 242/68.4 X |
| 2,775,357 | 12/1956 | DeArment | 414/911 X |
| 3,128,962 | 4/1964 | Bieber | 242/86.5 R |
| 3,861,616 | 1/1975 | Dubberke | 414/24.6 |
| 3,958,772 | 5/1976 | Hynson | 242/86.5 R |
| 4,194,702 | 3/1980 | Ploeg | 242/86.5 R |
| 4,211,376 | 7/1980 | Martin | 242/86.5 R |

FOREIGN PATENT DOCUMENTS

| | | | |
|---|---|---|---|
| 274935 | 7/1964 | Australia | 242/86.5 R |
| 1276921 | 6/1972 | United Kingdom | 242/68.4 |

Primary Examiner—Leslie J. Paperner

[57] ABSTRACT

An apparatus connected to a prime mover for handling a bale is provided and consists of a wheeled frame member to be moved with respect to the bale supported on the ground so that the frame member extends around the bale, structures on the frame member for rotatably engaging opposite ends of an elongated support member that engages and supports the bale, hydraulic cylinders on the frame member for raising and lowering the elongated support member relative to the ground whereby upward movement of the elongated support member will cause the bale to be raised from the ground and a gear drive mechanism on the frame member for rotating the elongated support member whereby rotation of the elongated support member will cause the bale to unroll.

5 Claims, 5 Drawing Figures

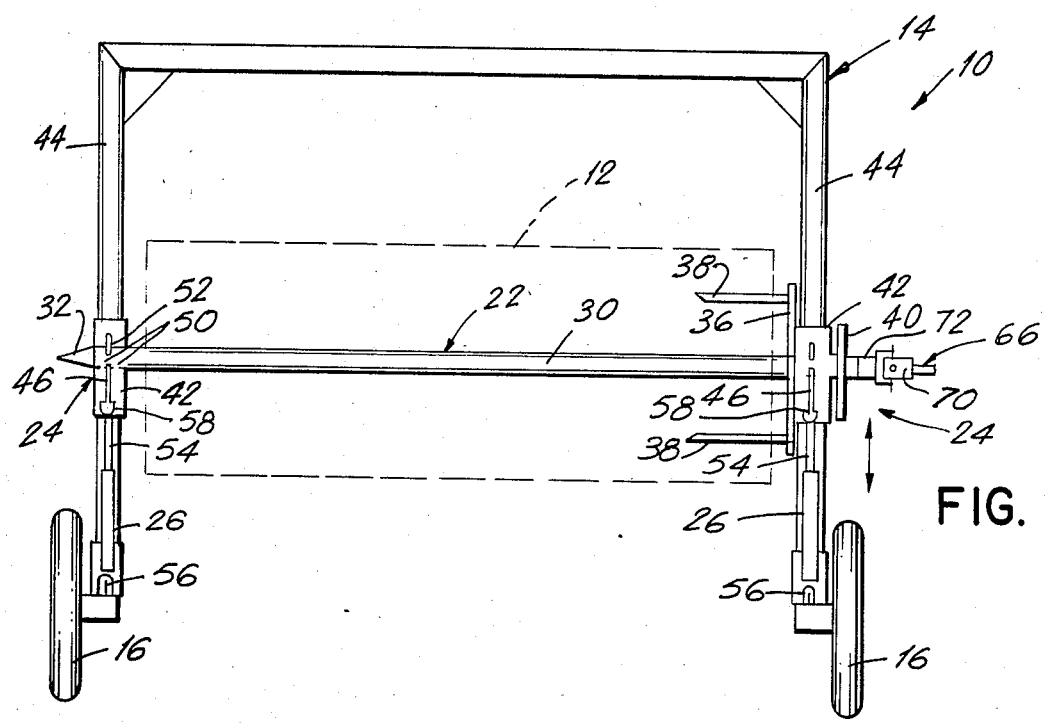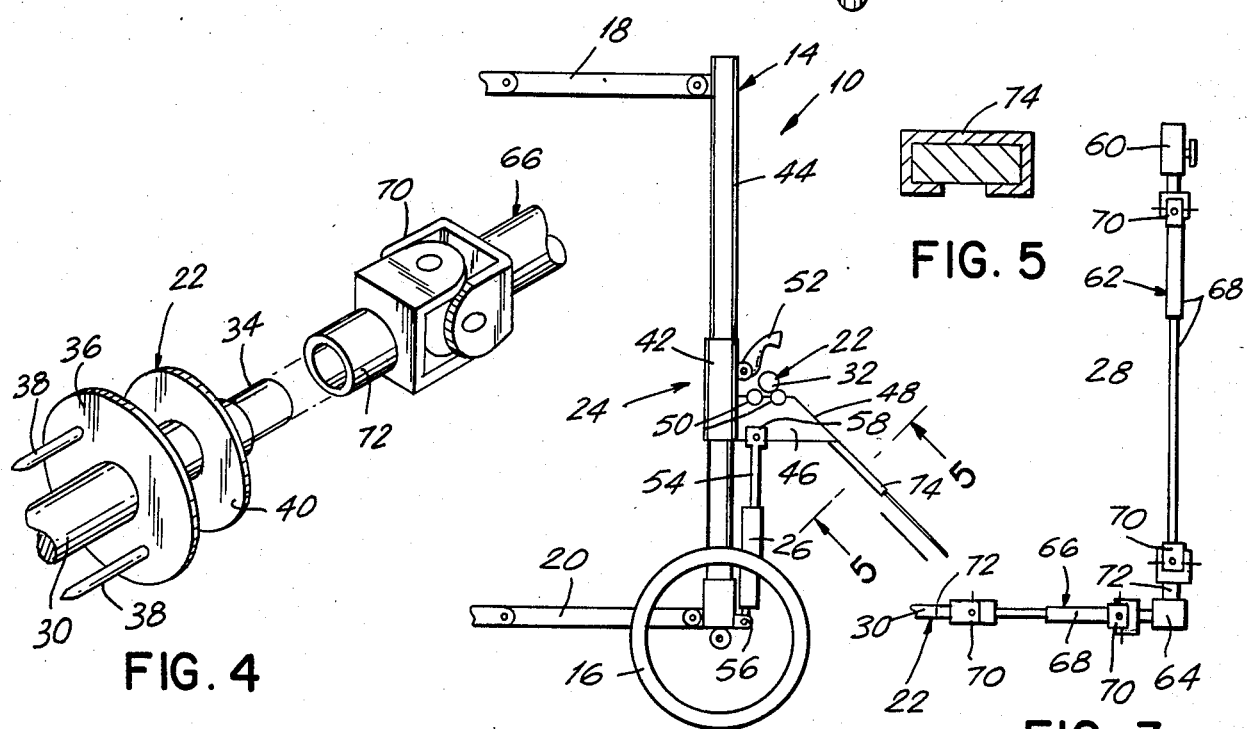

HAY BALE PROCESSOR

BACKGROUND OF THE INVENTION

The instant invention relates generally to bale transporting devices and more specifically it relates to an apparatus for handling a bale.

Numerous bale transporting devices have been provided in prior art that are adapted to load, convey and unload bales. For example U.S. Pat. Nos. 3,861,616; 3,908,846 and 4,095,706 all are illustrative of such prior art. While these units may be suitable for the particular purpose to which they address, they would not be suitable for the purposes of the present invention as heretofore described.

SUMMARY OF THE INVENTION

A principle object of the present invention is to provide an apparatus for handling a bale that will support the bale for transportation.

Another object is to provide an apparatus for handling bale that will mechanically rotate the bale so that the bale can unroll.

An additional object is to provide an apparatus for handling a bale that will mechanically raise and lower the bale from the ground.

A further object is to provide an apparatus for handling a bale that is simple and easy to use.

A still further object is to provide an apparatus for handling a bale that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is an elevational view of the invention.

FIG. 2 is a side view thereof showing a modification being an extensible plate to ground.

FIG. 3 is a top view of the gear boxes with linkages to drive the elongated support member.

FIG. 4 is a partial exploded perspective view of a portion of the elongated support member and one of the universal joints.

FIG. 5 is an enlarged cross sectional view taken along line 5—5 in FIG. 2.

DETAILED DESCRIPTION OF THE PREFERRED EMBODIMENTS

Turning now descriptively to the drawings, in which similar reference characters denote similar elements throughout the several views, FIGS. 1 to 4 illustrates an apparatus 10 connected to a prime mover (not shown) such as a tractor, for handling a bale 12 shown in phantom. The apparatus 10 consists of a frame member 14 with wheels 16 connected thereto. Arms 18 and 20 connect the frame member 14 to the prime mover to permit the frame member to be moved with respect to the bale 12 supported on the ground (not shown) so that the frame member 14 extends around the bale. An elongated support member 22 is for engaging and supporting the bale 12. Structures 24 on the frame member 14 are for rotatably engaging opposite ends of the elongated support member 22. A pair of hydraulic cylinders 26, 26 on the frame member 14 are for raising and lowering the elongated support member 22 relative to the ground whereby upward movement of the elongated support member will cause the bale 12 to be raised from the ground. A gear drive mechanism 28 as best seen in FIG. 3 on the frame member 14 is for rotating the elongated support member 22 whereby rotation of the elongated support member will cause the bale 12 to unroll.

The elongated support member 22 consists of an elongated shaft 30 that has a pointed end 32 and a splined end 34. The pointed end 32 passes through center of the bale 12 while the splined end engages the gear drive mechanism 28. A first disc member 36 that has bale penetrating tines 38 is affixed near splined end 34 of the elongated shaft 30. A second disc member 40 is affixed between the first disc member 36 and the splined end 34 of the elongated shaft 30.

Each structure 24 consists of a sleeve 42 slideably mounted to an upright portion 44 of the frame member 14. A plate 46 is transversely mounted to the sleeve 42 and has a beveled edge 48 extending outwardly therefrom. A pair of rollers 50 are mounted to top of the plate 46 with a pivotable spring loaded latch 52 mounted to the sleeve 42 above the pair of rollers 50 to rotatably engage one end of the elongated shaft 30. One latch 52 is between the first disc member 36 and the second disc member 40 preventing the elongated shaft 30 from laterally sliding off the rollers 50.

Each hydraulic cylinder 26 has a moveable rod 54 with the hydraulic cylinder pivotally mounted at 56 to bottom of each upright portion 44 of the frame member 14 and the moveable rod 54 pivotally mounted at 58 to bottom of the plate 46.

In the gear drive mechanism 28 a first reduction gear box 60 is driven by the prime mover not shown. A first drive shaft linkage 62 is connected to the reduction gear box 60. A second gear box 64 is connected to the first drive shaft linkage 62 while a second drive shaft linkage 66 is connected between the second gear box 64 and the splined end 34 of the elongated shaft 30 of the elongated support member 22.

The first and second drive shaft linkages 62 and 66 each consist of a telescopic shaft 68 and a pair of universal joints 70, 70 mounted at each end of the telescopic shaft 68. Each universal joint 70 has at least one splined collar 72 as best shown in FIG. 4.

FIGS. 2 and 5 show the plates 46 further containing telescopic arm members 74, 74 that can extend to the ground when the hydraulic cylinders 26, 26 are at their lowest position. The telescopic arm members 74, 74 can aid in guiding the elongated support member 22 with the bale 12 up onto the rollers 50.

While certain novel features of this invention have been shown and described and are pointed out in the annexed claims, it will be understood that various omissions, substitutions and changes in the forms and details of the device illustrated in its operation can be made by those skilled in the art without departing from the spirit of the invention.

What is claimed is:

1. An apparatus connected to a prime mover for handling a bale which comprises:

(a) a wheeled frame member;

(b) means for connecting said frame member to said prime mover to permit said frame member to be moved with respect to said bale supported on the ground so that said frame member extends around said bale;
(c) an elongated support for engaging and supporting said bale;
(d) means on said frame member for rotatably engaging opposite ends of said elongated support member;
(e) means on said frame member for raising and lowering said elongated support member relative to said ground whereby upward movement of said elongated support member will cause said bale to be raised from said ground;
(f) means on said frame member for rotating said elongated support member whereby rotation of said elongated support member will cause said bale to unroll, wherein said elongated support comprises:
 (a) an elongated shaft having a pointed end and a splined end, said pointed end passes through center of said bale while said splined end engages said means for rotating said elongated support member;
 (b) a first disc member having bale penetrating tines affixed near splined end of said elongated shaft; and
 (c) a second disc member affixed between said first disc member and said splined end of said elongated shaft; wherein said means on said frame member for rotatably engaging opposite ends of said elongated support member comprises:
 (a) a pair of sleeves, each said sleeve slideably mounted to an upright portion of said frame member;
 (b) a pair of plates, each said plate transversely mounted to each said sleeve and having a beveled edge extending outwardly therefrom;
 (c) two pairs of rollers each said pair of rollers mounted to top of each said plate; and
 (d) two pivotable spring loaded latches, each said latch mounted to each said sleeve above each said pair of rollers to rotatably engage one end of said elongated shaft whereby one of said latches is between said first disc member and said second disc member preventing elongated shaft from laterally sliding off said rollers.

2. An apparatus as recited in claim 1, wherein said means on said frame member for raising and lowering said elongated support member relative to said ground comprises a pair of hydraulic cylinders having moveable rods, each said hydraulic cylinder pivotally mounted to bottom of each said upright portion of said frame member with each said moveable rod pivotally mounted to bottom of each said plate.

3. An apparatus as recited in claim 2, wherein said means on said frame member for rotating said elongated support member comprises:
 (a) a first reduction gear box driven by said prime mover;
 (b) a first drive shaft linkage connected to said reduction gear box;
 (c) a second gear box connected to said first drive shaft linkage; and
 (d) a second drive shaft linkage connected between said second gear box and said splined end of said elongated shaft of said elongated support member.

4. An apparatus as recited in claim 3, wherein said first and second drive shaft linkage each comprises:
 (a) a telescopic shaft; and
 (b) a pair of universal joints mounted at each end of said telescopic shaft, each said universal joint having at least one splined collar.

5. An apparatus as recited in claim 4, wherein each said plate further comprises a telescopic arm member that can extend to said ground when each said hydraulic cylinder is at its lowest position so that said telescopic arm members can aid in guiding said elongated support member with said bale up onto said rollers.

* * * * *